UNITED STATES PATENT OFFICE.

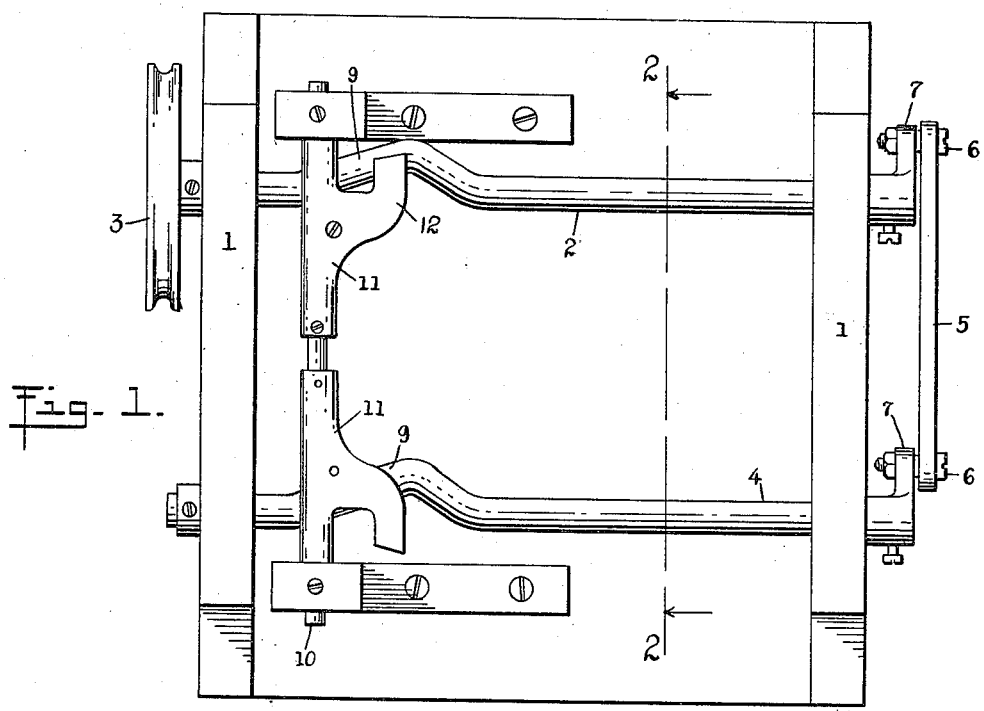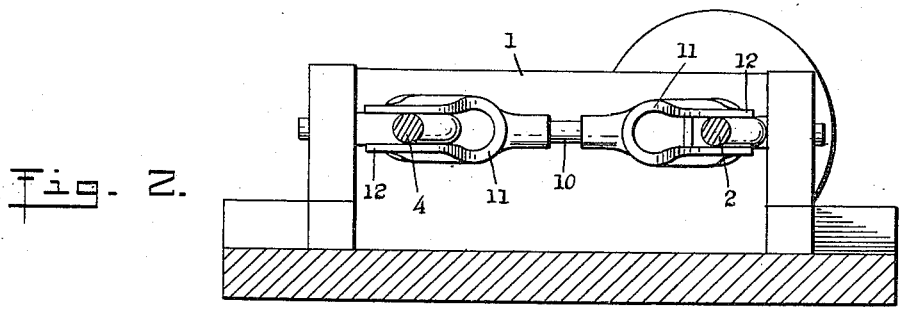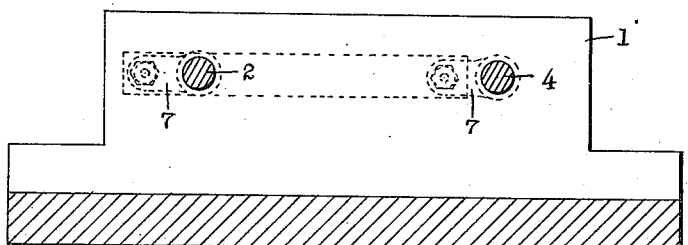

RUDOLPH DIEHL AND HERMAN MÜLLER, OF NEW YORK, N. Y.

TRANSMISSION.

1,158,791.  Specification of Letters Patent.  Patented Nov. 2, 1915.

Application filed October 25, 1913. Serial No. 797,155.

*To all whom it may concern:*

Be it known that we, RUDOLPH DIEHL and HERMAN MÜLLER, citizens of the United States, residing in the city of New York, borough of Brooklyn, county of Kings, and State of New York, have invented certain new and useful Improvements in Transmission, of which the following is a specification.

Our invention relates to a means for transmitting power between rotating members and specifically relates to a shaft coupling.

It is at present difficult to couple parallel shafting positively to each other especially where the members are disposed in close relation without utilizing expensively milled parts and one of the objects of our invention is to provide a positive simple and noiseless connection between a driving and one or more driven shafts, which connection can be cheaply constructed and installed without the necessity of refined milling or interfitting of parts. Accordingly we connect the driving shaft with the driven shaft by means of a plurality of connections which have their points of application at an angle to each other relative to their axis of rotation so that the effecting stroke of one connection alternately takes place as another connection approaches its dead center.

The various other objects of the invention will be more fully set forth in the following description of one form of mechanism embodying the invention which consists in the new and novel features of construction and combination of parts hereinafter set forth and claimed.

Referring to the accompanying drawings:—Figure 1 is a plan view looking down upon a system of shafting including a preferred physical embodiment of our invention; Fig. 2 is a vertical transverse sectional view taken on a plane indicated by the line 2—2 of Fig. 1 and looking in the direction indicated by the arrow; and Fig. 3 is a similar view looking in the reverse direction.

In the drawing is shown a suitable bearing 1 in which is mounted for rotation a main or driving shaft 2 to which motion is conveyed by some means such as the pulley wheel 3. Mounted on the bearings 1 and preferably parallel to the shaft 2 is a driven shaft 4. The shafts are connected to each other by means of the link 5 which is pivoted directly to the crank pins 6 of the cranks 7 which are attached to or formed integral with the ends of the shafts and extend in the same direction relative to their axis. Each shaft has an offset portion forming a bearing rod 9 which extends at an acute angle to the axis of rotation of the shaft and preferably in the plane of the crank 7 thereof. A rod 10 extends transversely of the shafts and is mounted for oscillation preferably with its axis in the plane with the axis of the shafts.

Rigidly fixed to the rod 10 are jaws 11 straddling each of the bearing rods 9 and having spaced projecting flanges 12 extending parallel to the rod 10 and continuously in engagement with opposite sides of the bearing rods 9. In operation with the parts in the position shown in Fig. 1, suppose the movement of the driving shaft is such as to raise the bearing rod 9 of the driven shaft from the horizontal position shown, in which case the rod 9 of the driving shaft would bear against its upper engaging flange 12 and this movement would be conveyed through the rigid connection provided by the rod 10 and cause the lower flange 12 of the driven shaft to raise its bearing rod 9 and acting through the driven shaft, assist the driving shaft in moving the cranks 7 off their dead centered positions, shown in Fig. 1. With a quarter revolution the bearing rods 9 are in a dead centered position relative to the flanges 12 but at this time there is a direct line pull on the cranks 7 and when the shafts have made another quarter turn and the cranks are again on dead centers on the opposite side of their axis but the connection through rods 9 and flanges 12 again acts to maintain the continuous rotation of the shafts.

Although we have shown only one form of mechanism embodying our invention, it is obvious that various changes within the skill of the mechanic may be made therein without departing from the spirit of the invention, provided the means set forth in the following claims are employed.

Having thus described our invention, we claim:—

1. In a transmission, the combination with a pair of parallel shafts, a crank on each shaft, a link connecting said cranks, each shaft including a bearing rod disposed at an acute angle to its axis of rotation and offset in a direction parallel to its crank, jaws straddling each shaft and having spaced flanges engaging opposite sides of the bearing rods and a rigid connection between said jaws.

2. In a transmission, the combination with a pair of parallel shafts, a connecting means for driving one of said shafts from the other, of a supplemental driving connection between said shafts comprising a shaft operatively connected to said shafts, oscillating about a fixed axis disposed transversely of the shafts and in a plane containing the axis of rotation of the shafts and operatively connected to said shafts to move the same partially about their cycle of rotation.

3. In a power transmission the combination with a driven shaft having a crank and a power transmitting link pivoted to said crank, of means for moving said link off its dead center relative to said crank and comprising reciprocating means engaging said shaft transversely of and to one side of its axis of rotation when said link is on its dead center.

4. In a power transmission, the combination with a pair of parallel shafts having parts offset from their axis of rotation and extending parallel to each other, jaws having flanges bearing on said offset parts and means for simultaneously moving said jaws thereby to partially rotate said shafts in unison.

5. In a power transmission, the combination with a pair of parallel shafts having parts offset from their axis of rotation and extending parallel to each other, jaws having flanges bearing on said offset parts, means for simultaneously moving said jaws thereby to partially rotate said shafts in unison and other means connecting said shafts for further rotating the same.

6. In a device of the class described, a pair of parallel shafts, one being a driving and the other being a driven shaft, each shaft having a crank and a link connecting said cranks, each shaft having a portion offset from its axis of rotation in the direction of said cranks, a third shaft extending transversely of said parallel shafts, a pair of jaws fixed to said third shaft, each jaw straddling one of the offset portions of said shafts.

This specification signed and witnessed this 18th day of October, A. D., 1913.

RUDOLPH DIEHL.
    HERMAN MÜLLER.

Signed in the presence of—
 JOSEPH HERBST,
 FISHER KOLSKZ.

Copies of this patent may be obtained for five cents each, by addressing the "Commissioner of Patents, Washington, D. C."